March 24, 1959 J. W. RUNNER 2,878,901
SELF-ENERGIZING BRAKE ADJUSTMENT
Filed March 19, 1957

INVENTOR
JOHN W. RUNNER

BY *R. L. Miller*
ATTORNEY

United States Patent Office 2,878,901
Patented Mar. 24, 1959

2,878,901
SELF-ENERGIZING BRAKE ADJUSTMENT

John W. Runner, Akron, Ohio, assignor to The Goodyear Tire & Rubber Company, Akron, Ohio, a corporation of Ohio Application March 19, 1957, Serial No. 647,114

3 Claims. (Cl. 188—73)

This invention relates to devices for providing automatic adjustment of the clearance in a disc type brake, and is particularly useful in the construction of adjustment devices having a friction grip where it is desired to provide greater friction to movement in one direction.

It has been found advisable to provide an automatic clearance mechanism in which greater friction is provided against advance of the adjusting pin in a direction toward the brake disc (to compensate for lining wear) than in the opposite direction (to facilitate brake relining). The present invention provides such mechanism.

The general object of the invention is to provide an inexpensive, long wearing, and easily installed self-energizing grip which will provide greater resistance to advance of an automatic adjusting pin in the direction to compensate for lining wear than in the opposite direction.

These and other objects will appear from the following description and the accompanying drawing.

Figure 1:
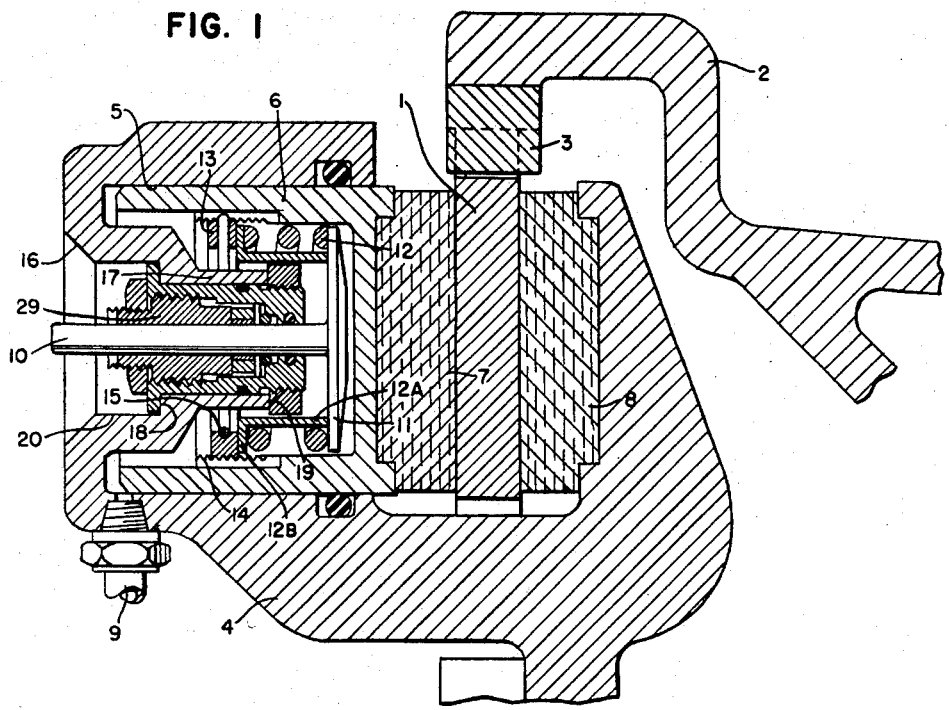
Fig. 1 is a cross-sectional view of a wheel and brake assembly showing one of the brake-operating cylinders having an adjustment constructed in accordance with and embodying this invention, and with the parts being shown in brake-operating position wherein the normal operating clearance has been used up.

Referring to the drawings, the numeral 1 designates a brake disc mounted for rotation with a wheel 2 from which it is driven by keys 3 on the wheel engaging in slots about the periphery of the disc whereby the disc may float axially of the wheel to a limited degree.

Mounted about the brake disc 1 is a C-shaped non-rotatable support 4 provided at one face of the disc 1 with one or more brake operating cylinders 5 for slidably receiving pistons 6 each carrying a brake shoe or lining 7 for engaging the face of the brake disc, and at the opposite side of the brake disc, the support 4 is provided with a stationary brake shoe or lining 8 opposite the cylinder, the arrangement being such that when hydraulic pressure is applied to cylinder 5, piston 6 advances to the right as seen in Fig. 1 and engages the shoe 7 against the disc which being free to float axially moves in turn to abut the shoe 8. For supplying hydraulic pressure, a pipe connection 9 connects the cylinder to a supply through a valve operated by the pilot.

For returning the piston, when the hydraulic pressure is released, a mushrom-like pin 10 is mounted in a manner hereinafter described in the cylinder with its head 11 within the bore of the hollow piston. Suitable spring means such as a compression coil spring 12 is mounted between the head 11 of the pin and an adjustable collar 13 engaging threads 14 in the skirt of the piston and adjustable during assembly axially of the piston. A spring lock ring 15 is provided to lock such adjustment.

A sleeve 12a, having an intergral radial skirt 12b positioned between the collar 13 and the spring 12, extends into close proximity with the head 11 of pin 10 to provide normal operating clearance. Specifically, Fig. 1 shows the brake in operating position with the operating clearance used up between end of sleeve 12a and head 11 so that farther movement of the piston 6 to the right will begin to pull pin 10 to the right.

Release of hydraulic pressure behind the piston 6 allows spring 12 to return piston 6 to brake-off position with the inside of the head of the piston abutting head 11 of pin 10 and re-establishing operating clearance between end of sleeve 12a and head 11. Thus, it can be said that a lost-motion connection is provided between pin 10 and piston 6 in an amount equal to the normal operating clearance.

The rear wall 16 of the cylinder 5 is formed with a tubular collar portion 17 which extends into the cylinder and within the skirt portion of the piston. This collar is bored concentric with the cylinder, the bore terminating in annular shoulders 18, 19. The shoulder 18 is located in a counterbore 20.

Figure 2:
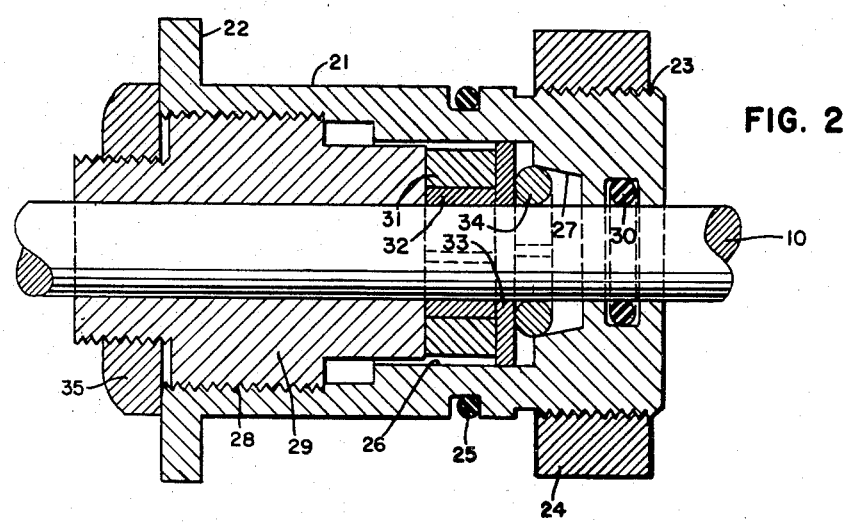
Fig. 2 is an enlarged cross-sectional view of the adjustment alone, other parts being broken away.

As more clearly seen in Fig. 2, the automatic clearance adjustment is mounted in a sleeve 21 having a shoulder 22 at one end for abutting the shoulder 18 and being threaded externally at the opposite end as at 23 to receive a clamp nut 24 whereby it may be held in place. A sealing ring 25 is seated in a circumferential groove of the sleeve 21 to seal the hydraulic fluid. The arrangement is such that the adjustment unit contained in sleeve 21 may be removed and replaced in the collar portion 17 as a unit.

The sleeve 21 is bored axially to provide a counterbore 26 terminating in a conical portion 27 having an included angle of about 20 degrees which is great enough to always prevent locking of ring 34 as hereinafter described. The mouth of the counterbore is internally threaded as at 28 to receive a threaded bushing 29 having sliding engagement over the pin 10. A sealing ring 30 seals the closed end of sleeve 21 about pin 10.

For frictionally retaining the pin 10 in the sleeve 21, a friction collar is provided thereabout and comprises a split spring steel ring 31 having a bore greater than the pin 10 and a split metal liner ring 32 therewithin for gripping the pin. A washer 33 is provided about the pin 10 within sleeve 21 at one end of the split rings to hold them in position, the other face of the rings abutting a radial face of the bushing 29.

For providing increased resistance to movement of the pin to the right, as seen in Fig. 2, a split ring 34 of round cross-section is mounted about the pin 10 within the conical portion 27 of sleeve 21 and is confined closely by the proximity of washer 33. The clearance is kept very close and may be adjusted by turning the bushing 29 in the sleeve 21. The bushing is locked in position by the lock nut 35. The arrangement is such that any movement of pin 10 to the left, as seen in Fig. 2 meets such resistance as is offered by the frictional grip of collars 31 and 32 on the pin 10, whereas movement in the opposite direction is additionally resisted by ring 34 being forced into frictional engagement with the pin 10 by the wedging surface 27. It is to be noted further that the frictional gripping force of ring 34 is a function of the frictional grip of collars 31 and 32 for the reason that the collars are the means for pushing the ring 34 into the wedging surface 27. The result is that a structure is provided in which movement of the pin 10 to the right in Fig. 2 takes approximately twice the force required for movement to the left.

In describing collars 31, 32 and 34, these have been described as split-collars. Each of these is a completely annular collar with the exception of a gap about one thirty-second of an inch wide. Collar 32 is made of brass or bronze so as to provide minimum scoring of the pin 10. Collar 34 is also of relatively soft metal such as brass or bronze.

In the operation of the brake, the spring 12 normally holds the lining 7 clear of the brake disc in the brake-off position by the amount of normal operating clearance, the piston 6 engaging the head 11 of pin 10 which is frictionally held against movement. When the brake is applied by applying hydraulic pressure to cylinder 5, the piston 6 is moved to the right compressing spring 12 and sequeezing the disc 1 between brake linings 7 and 8 all within the limit of movement provided by the normal operating clearance between sleeve 12a and head 11. However, as the clearance between the linings 7 and 8 and the disc 10 increases upon repeated brake application due to wear of the linings, a greater forward movement of piston 6 must take place to engage the brake than that allowed by the normal operating clearance between sleeve 12a and head 11. When the normal operating clearance is exceeded in order to bring the linings 7 and 8 into engagement with the disc 1, the sleeve 12a carried by the piston 6 engages the head 11 of pin 10 urging it through its frictionally engaged collars 31 and 32 accompanied by the self-energizing resistance of collar 34 wedging on surface 27. Thus, the pin 10 is periodically repositioned as lining wear occurs to always provide the same operating clearance. Movement of the pin 10 in the opposite direction requires only about one-half the force to overcome the frictional grip of collars 31 and 32 with collar 34 being released as it moves out of wedging surface 27.

This is an advantage when due to application of too much pressure or other causes, springing of the frame results in overadjustment of the pin and dragging of the brake. In such cases the pin may be more easily forced back by recovery of the frame.

While a certain representative embodiment and details have been shown for the purposes of illustrating the invention, it will be apparent to those skilled in this art that various changes and modifications may be made therein without departing from the spirit or scope of the invention.

I claim:
1. In an automatic brake adjustment to compensate for lining wear a rotary member, a brake lining, hydraulic means including a piston for moving the lining into braking engagement with the member, stop means including a piston-engaging head and a supporting stem for limiting brake release movement of the hydraulic means, a lost-motion connection between the stop means and the piston, resilient friction means encompassing the stem of the stop means under stress and resisting movement of the stop means in brake-off and in brake-on direction, and additional friction means also encompassing said stem resisting movement of the stop means in brake-on direction only.

2. In an automatic brake adjustment to compensate for lining wear a rotary member, a brake lining, hydraulic means including a piston for moving the lining into braking engagement with the member, stop means including a piston-engaging head and a supporting stem for limiting brake release movement of the hydraulic means, a lost-motion connection between the stop means and the piston, resilient friction means encompassing the stem of the stop means under stress and resisting movement of the stop means in brake-off and in brake-on direction, a split spring ring encompassing the stem of said stop means and normally unstressed so as to permit free movement of the stem therethrough, a stationary conical surface against which the ring is moved when the stop means are moved in brake-on direction to frictionally engage the stop means with the ring.

3. An automatic brake adjustment as defined in claim 2 in which the friction means act to push the ring into the conical surface upon movement of the stop means in brake-on direction.

References Cited in the file of this patent

UNITED STATES PATENTS

| | | |
|---|---|---|
| 847,164 | Corn | Mar. 12, 1907 |
| 2,551,252 | Du Bois | May 1, 1951 |
| 2,568,858 | Kovac | Sept. 25, 1951 |